United States Patent
Gataric

(10) Patent No.: US 12,026,458 B2
(45) Date of Patent: Jul. 2, 2024

(54) SYSTEMS AND METHODS FOR GENERATING DOCUMENT TEMPLATES FROM A MIXED SET OF DOCUMENT TYPES

(71) Applicant: State Farm Mutual Automobile Insurance Company, Bloomington, IL (US)

(72) Inventor: Alexander Gataric, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/054,769

(22) Filed: Nov. 11, 2022

(65) Prior Publication Data

US 2024/0176949 A1    May 30, 2024

(51) Int. Cl.
*G06F 17/00* (2019.01)
*G06F 16/35* (2019.01)
*G06F 40/186* (2020.01)
*G06V 30/10* (2022.01)
*G06V 30/414* (2022.01)

(52) U.S. Cl.
CPC .......... *G06F 40/186* (2020.01); *G06F 16/355* (2019.01); *G06V 30/10* (2022.01); *G06V 30/414* (2022.01)

(58) Field of Classification Search
CPC ..... G06F 40/186; G06F 16/355; G06V 30/10; G06V 30/414
See application file for complete search history.

(56) References Cited

U.S. PATENT DOCUMENTS

| | | | |
|---|---|---|---|
| 6,356,655 B1 * | 3/2002 | Sumikawa | G06V 30/412 382/175 |
| 7,149,347 B1 * | 12/2006 | Wnek | G06V 30/416 382/209 |
| 7,561,734 B1 * | 7/2009 | Wnek | G06V 30/412 382/218 |
| 8,965,134 B2 | 2/2015 | Kompalli et al. | |
| 9,069,768 B1 | 6/2015 | Sampson | |

(Continued)

OTHER PUBLICATIONS

Zucker, Arthur, et al. "ClusTi: Clustering method for table structure recognition in scanned images." Mobile Networks and Applications 26.4 (2021): 1765-1776 (Year: 2021).*

(Continued)

*Primary Examiner* — Andrew T McIntosh
(74) *Attorney, Agent, or Firm* — Armstrong Teasdale LLP

(57) ABSTRACT

A template generation system for generating document templates from a mixed set of document types including a template generation server programmed to receive a batch of documents, identify a plurality of text blocks, generate a plurality of clusters, generate a plurality of document arrays corresponding to the plurality of clusters, and compare each document array to each other document array to determine a percentage match. When the percentage match between two or more frameworks exceeds a threshold, the template generation system defines a subset of documents, and for each subset of documents, template generation system generates a template for the subset of documents. The template is a collection of the text blocks that are commonly included in each of the documents of the subset.

20 Claims, 6 Drawing Sheets

(56) References Cited

U.S. PATENT DOCUMENTS

| | | | |
|---|---|---|---|
| 10,181,184 | B2 | 1/2019 | Li et al. |
| 10,216,838 | B1 | 2/2019 | Pueyo et al. |
| 10,373,012 | B2 | 8/2019 | Jean et al. |
| 10,410,087 | B2 | 9/2019 | Zagaynov et al. |
| 10,628,702 | B1 | 4/2020 | Gerstner et al. |
| 10,657,158 | B2 | 5/2020 | Sheng et al. |
| 11,126,839 | B2 | 9/2021 | Ghessassi |
| 11,256,760 | B1 | 2/2022 | Corcoran et al. |
| 11,527,055 | B2* | 12/2022 | Jaber ................... G06F 18/23 |
| 11,715,310 | B1* | 8/2023 | Sammons ............ G06F 18/214 382/157 |
| 2007/0168382 | A1* | 7/2007 | Tillberg .............. G06F 16/5846 707/E17.084 |
| 2013/0325862 | A1* | 12/2013 | Black ................... G06F 16/285 707/E17.089 |
| 2014/0369602 | A1 | 12/2014 | Meier et al. |
| 2015/0324453 | A1 | 11/2015 | Werner |
| 2016/0154892 | A1* | 6/2016 | Carrier ................ G06F 40/295 707/691 |
| 2016/0314184 | A1 | 10/2016 | Bendersky et al. |
| 2017/0330030 | A1 | 11/2017 | Kalyuzhny |
| 2017/0351913 | A1* | 12/2017 | Chen ................... G06V 30/412 |
| 2021/0081602 | A1 | 3/2021 | Begun et al. |
| 2021/0224568 | A1* | 7/2021 | Zhang ................. G06V 30/153 |
| 2021/0383067 | A1* | 12/2021 | Reisswig ............. G06F 40/295 |
| 2022/0100797 | A1* | 3/2022 | Mane ................... G06N 20/00 |
| 2022/0108065 | A1* | 4/2022 | Eshghi ................ G06F 16/164 |
| 2022/0156300 | A1* | 5/2022 | Paruchuri ............. G06N 3/08 |
| 2022/0207268 | A1* | 6/2022 | Gligan ................. G06F 40/137 |
| 2023/0230406 | A1* | 7/2023 | Mehra .................. G06N 3/08 382/175 |

OTHER PUBLICATIONS

Shaban, Khaled Bashir. "A Semantic Approach for Document Clustering." J. Softw. 4.5 (2009): 391-404 (Year: 2009).*

Sun, Kexuan, et al. "Tabular Functional Block Detection with Embedding-based Agglomerative Cell Clustering." Proceedings of the 30th ACM International Conference on Information & Knowledge Management. 2021 (Year: 2021).*

ChronoScan Capture—Document Capture Software, retrieved from https://www.chronoscan.org/features_idr_Intelligent_document_recognition.asp, retrieved Nov. 11, 2022.

* cited by examiner

FIG. 3

SYSTEMS AND METHODS FOR GENERATING DOCUMENT TEMPLATES FROM A MIXED SET OF DOCUMENT TYPES

FIELD OF DISCLOSURE

The present disclosure relates generally to dynamically generating document templates and, more particularly, to a network-based systems and methods for generating document templates using matching text values and locations of those text values within a batch of input documents to identify matching documents for which a template may be generated.

BACKGROUND

Documents are used to collect data for a variety of reasons. These documents may be form documents such as physical documents that people fill-out by hand or online documents that people fill-out by typing in responses. In the insurance industry, for example, it is common for policyholders to submit documents during an insurance claim process, such as a copy of a driver's license or insurance policy card, vehicle repair bills, medical bills, police reports, and the like. These documents are intended to provide information relevant to the insurance claim. Policyholders may also have to fill-out other form documents that are submitted as part of the processing of the claim.

In at least some cases, human personnel are tasked with identifying and reviewing these documents. These personnel must properly identify the type of document based on the information provided by each document. These tasks are tedious and prone to error. Some existing methods of automating document processing involve training a model using a dataset, which can involve significant modelling capabilities as well as significant computing resources to train and store such models.

BRIEF DESCRIPTION OF THE DISCLOSURE

The present embodiments relate to systems and methods for generating document templates from a mixed set of document types. As described herein, a batch of documents of various document types are inputted into a template generation system. In the exemplary embodiment, the template generation system may not require any prior training or user-input identification of the document types. Rather, the template generation system is configured to operate "on-the-fly", or dynamically, to generate any appropriate number of templates that may then be used to classify subsequent documents. Specifically, the template generation system of the present disclosure generates a framework to represent each document based on text blocks identified within each document. The text blocks are defined by the spatial location of the text and the value of the text. The frameworks are compared between documents, and, when enough matches are located, the documents are determined to be of the same document type. A template may then be generated when a threshold number of documents in a batch have been identified as the same type.

In one aspect, a template generation system including a template generation server including a memory and at least one processor, wherein the at least one processor is programmed to: (a) receive a batch of documents including a plurality of documents of different document types, (b) identify a plurality of text blocks located within each document of the batch of documents, wherein each text block includes a text value and a spatial location of the text block within the document, (c) generate a plurality of clusters, wherein each of the plurality of clusters includes a plurality of text blocks identified in each respective document, wherein each text block included in the cluster has substantially matching text values and spatial locations, (d) generate a plurality of document arrays, wherein each document array corresponds to one of the plurality of clusters and includes a listing of documents containing the text blocks included in the cluster, (e) compare each document array to each other document array to determine a percentage match, (f) when the percentage match between two or more document arrays exceeds a threshold, define a subset of documents including the documents included in the matching document arrays, and (g) for each subset of documents, generate a template for the subset of documents. The system may include additional, less, or alternate functionality, including that discussed elsewhere herein.

In another aspect, a computer-implemented method of generating a template, the method implemented by a template generation server having a memory and a processor, the method including: (a) receiving a batch of documents including a plurality of documents of different document types, (b) identifying a plurality of text blocks located within each document of the batch of documents, wherein each text block includes a text value and a spatial location of the text block within the document, (c) generating a plurality of clusters, wherein each of the plurality of clusters includes a plurality of text blocks identified in each respective document, wherein each text block included in the cluster has substantially matching text values and spatial locations, (d) generate a plurality of document arrays, wherein each document array corresponds to one of the plurality of clusters and includes a listing of documents containing the text blocks included in the cluster, (e) comparing each document array to each other document array to determine a percentage match, (f) when the percentage match between two or more document arrays exceeds a threshold, defining a subset of documents including the document included in the matching document arrays, and (g) for each subset of documents, generating a template for the subset of documents. The method may include additional, less, or alternate functionality, including that discussed elsewhere herein.

In yet another aspect, a template generation system including a computing device including at least one memory and at least one processor, wherein the template generation system is communicatively coupled to a database, wherein the at least one processor is programmed to: (a) store, in the database, a plurality of templates, each template corresponding to a subset of documents, (b) store, in the database, a plurality of documents, wherein each document includes an identifier to one of the plurality of templates, (c) store, in the database, a plurality of unmatched document, wherein each of the unmatched documents do not include the identifier to one of the plurality of templates, (d) receive a batch of documents including a plurality of documents of different document types, (e) identify a plurality of text blocks located within each document of the batch of documents, wherein each text block includes a text value and a spatial location of the text block within the document, (f) generate a plurality of clusters, wherein each of the plurality of clusters includes a plurality of text blocks identified in each respective document, wherein each text block included in the cluster has substantially matching text values and spatial locations, (g) generate a plurality of document arrays, wherein each document array corresponds to one of the plurality of clusters and includes a listing of documents containing the text blocks included in the cluster, (h) compare each document array to each other document array to determine a percentage match, (i) when the percentage match between two or more document arrays is exceeds a threshold, define a subset of documents including the documents included in the matching document arrays; and (j) for each subset, apply a template identifier to the subset if a matching template is identified. The computing device may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 3 illustrates an example of a document which may be input into the template generation system.

Figure 1:
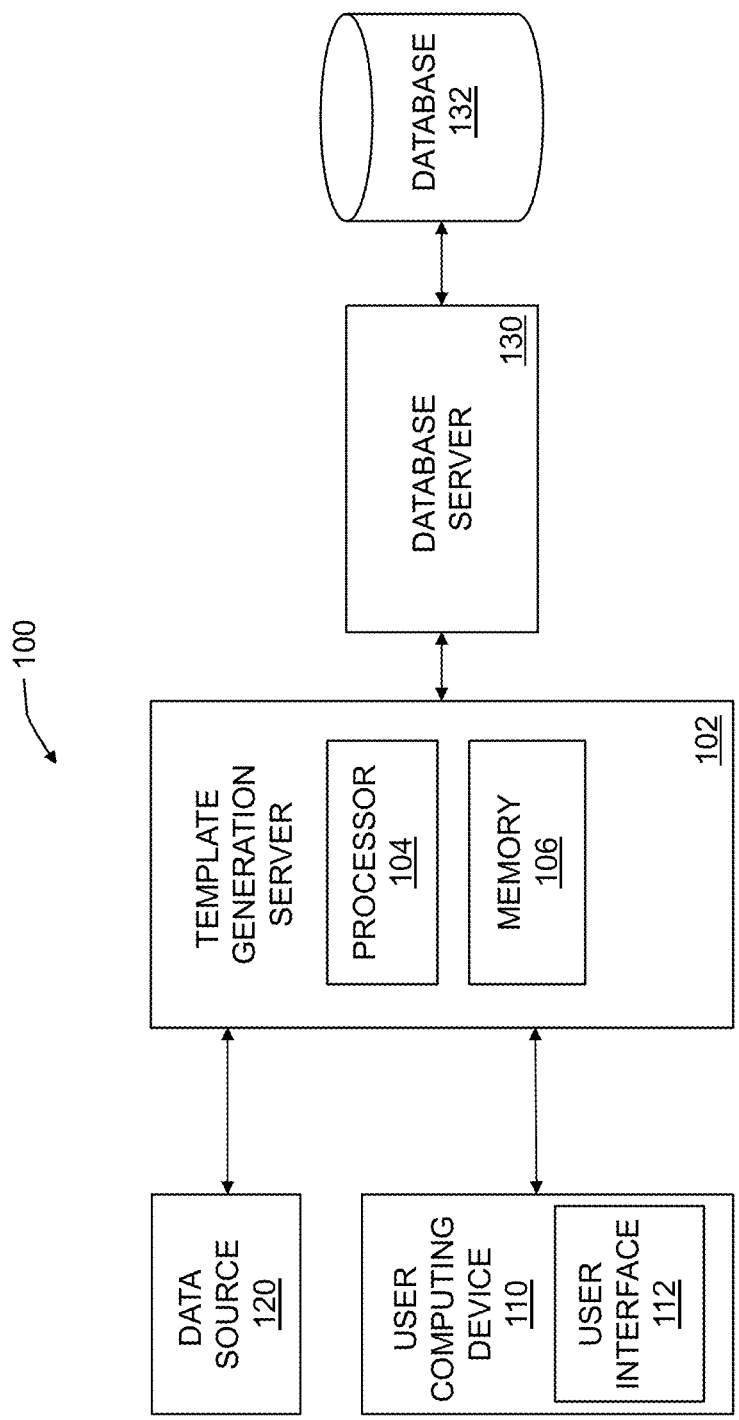
FIG. 1 illustrates a schematic diagram of an exemplary template generation system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for generating templates for identified types of documents from a batch of documents. As used herein, "type" refers to a layout or format which is common across a plurality of documents, and "template" refers to a data structure representing the layout or format of the plurality of documents. As described further herein, the template may be generated from an identified subset, wherein "subset" refers to documents of the same type that are determined to match or share a similar format and/or type.

The systems and methods described herein overcome the deficiencies of other known systems, as described in greater detail herein. In one exemplary embodiment, the process may be performed by a template generation system. In the exemplary embodiment, the template generation system may be a web server associated with, for example an insurance provider.

In order to process an insurance claim, the insurance provider (also referred to as an "insurer") often receives many documents associated with the insurance claim. Given the volume of claims processed by an insurance provider, there may be a large number of documents received—either substantially continuously or in periodic batches, such as daily—which require further processing. It is contemplated that hundreds or thousands of documents, at least, may require processing, for classification and subsequent analysis.

In the exemplary embodiment, the template generation system may receive a batch of documents including many different types of documents, such as, but not limited to, police reports, driver's licenses, insurance policy cards or other identifying documents, vehicle repair bills, medical bills, and the like. As used herein, a "batch" of documents may refer generally to a plurality of documents of various types that are processed in a same template-generation and/or template matching (e.g., classification) operation. Moreover, as used herein, different "types" of documents (e.g., "document types") generally refers to documents which share a common format and form a subset of documents of the same type. For example, a W-2 tax form may be an example of a type of document. When that form is populated for five different individuals, those documents represent five instances of that type of document, as they follow a common format, but differ in some of the text included within the form. Those five documents can be considered a subset. As used herein, "subset" will generally refer to any group of documents which follow a similar format, and therefore, the documents are of the same document type.

It is recognized that when a batch of documents includes many different types of documents, it can complicate processing. If subsets of documents can be identified, wherein each document in a subset is of the same type and follows a similar format (e.g., "matches" or "substantially matches"), the automatic processing of the documents can be streamlined.

The template generation system as described herein includes a template generation server or computing device. Initially, the template generation server receives a batch of documents. The template generation server includes a text analyzer module. The text analyzer module scans each document and identifies text blocks. As used herein, "text block" may refer generally to any grouping of text located on or in a document. Each document may include static text values, which remain the same across a subset of documents, as well as variable text values, which are contextually responsive to associated static text values and may therefore change across instances of the document. Examples of static text values may include labels of fields commonly requested on documents such as "Name", "Date of Birth", "Phone Number", etc. The text that is prompted to be filled in by the static text values in such fields, or that is contextually responsive to those field labels, is considered a variable text value.

In the exemplary embodiment, the text analyzer module identifies and captures a text value (e.g., the text of a static text value itself) and a spatial text location of that text value within the document for each text block. The text location may be defined by a set of coordinates (e.g., bounding boxes as described in greater detail below), or any other relevant way to denote the location within the document. In some cases, a text field box is defined for the text block, the text field box including a height and width of the text block. In one particular embodiment, two points (e.g., within the bounding boxes described below) are used to define the text location of a text value of a static text block, such as a "bottom-left" and a "top-right", which together inherently define a text field box of the text block with minimal data points.

Template generation system as described herein further includes a cluster generation module. The cluster generation module defines a clusters of text blocks. As used herein, "cluster" generally refers to an array of text blocks which overlap in spatial location and have identical or substantially matching text value. The clusters may be stored as one or more rows or entries in a table, or as another data structure or may be represented by entries in a database, which represent all the text blocks contained within the cluster. The data entries may include a document reference, which references a document which contains text field boxes identified within the cluster, and the corresponding text value and spatial location of the cluster.

A user may define a margin within which text blocks must match in order to be clustered. In some instances, a range may be defined within which the spatial text location should match between text blocks to define a cluster. Similarly, capital letters or misspellings may be included or excluded when comparing text values. Notably, in the exemplary embodiment, only identified static text values are utilized in identifying and defining the text blocks that are identically or substantially matching, while variable text values are largely ignored for the purposes defining clusters.

The cluster generation module also generates document arrays. As used herein, "document arrays" are arrays corresponding to each identified cluster containing a reference to each document which includes a text block which belongs to the corresponding cluster.

The template generation system may also include a comparison module. The comparison module compares the document arrays to determine whether there is an identical match or a substantial match between two or more of the document arrays. As used herein, "substantial match" will generally indicate that two document arrays match within an accepted degree or threshold level of confidence. The substantial match may be defined by a threshold number or percentage of overlap or match between two document arrays. A substantial match between two or more document arrays represents a match between the associated documents, or, in other words, a substantial match between two or more document arrays represents that the associated documents can be classified into a common category or type of document. In the exemplary embodiment, arrays overlapping by 70% or more are considered to meet the threshold. Once the threshold is met, a preliminary subset, sometimes referred to as a temporary document ID array cluster, is defined.

The comparison module stores (e.g., in a local cache for efficient reference) one or more threshold criterion that, when met, trigger the generation of a template. In the exemplary embodiment, the threshold criterion may include a document match percentage. As used herein, "document match percentage" generally refers to a percentage of clusters which match between two or more given document arrays. For example, clusters are aggregated for each document to determine a document cluster count. The document cluster counts for each of the documents of the preliminary subset are aggregated to determine a total cluster count. A document match percentage can be determined by dividing each document cluster count from the total cluster count. The number of document match percentage may be user defined. In the exemplary embodiment, a document match percentage of 85% is required, and documents having a document match percentage less than 85% are removed from the preliminary subset. Once all documents meet or exceed the document match percentage, a final subset is defined The template module generates a template for each final subset identified. The template is defined as a common framework which includes the text blocks which are common across each of the frameworks of the subset.

The template generation server is communicatively coupled to a database in which the template generation server stores the generated templates. The template generation server may also store or cache intermediate values used during the generation of the templates. For example, the framework generation module stores the identified text blocks in the database. For each text block, the text analyzer module stores values corresponding to a text value and a spatial text location. The cluster generation module may generate a cluster ID value which can be stored in the database entry for each text block included in the cluster. Additionally, or alternatively, the cluster generation module creates a separate table to store information for each identified cluster. The comparison module stores the text blocks, clusters, and templates in the database.

For any documents for which no matches are found, the template generation server may locally cache the documents. Unmatched documents may be used in an input set of a future template generation process.

Template generation server continuously receives new documents, matches to existing templates, and generates new templates. As new batches of documents are received, template generation server identifies text blocks and generates clusters and document arrays according to the previous description. However, prior to generating new templates, template generation server first checks to see if any of the documents identically or substantially match any existing templates. If no matching templates are found, template generation server continues according to the process previously describes, and the document arrays are compared to identify matching subsets and new templates may be generated.

Because the database utilizes very simple data entries within a database to define text blocks, define clusters as a collection of text blocks, compare document arrays, and define templates from subsets of documents, the template generation sever is able to perform the template generation described herein using a limited amount of data, resulting in faster computational speeds and reduced memory and processing requirements as compared to other known systems. Known methods of matching documents and generating templates that may involve machine learning or artificial intelligence require large amounts of data and computing resources. Notably, in many cases, machine learning requires utilizing a training set of data. The systems and methods described herein do not require any training prior to the input of a batch of documents. Therefore, the systems and methods described herein may be faster and may require significantly fewer computational resources than machine learning or artificial intelligence models.

FIG. 1 illustrates a schematic diagram of an exemplary template generation system 100 for document processing. Template generation system 100 includes a template generation server 102 that is capable of receiving a batch of documents and generating templates. In the exemplary embodiment, template generation server 102 includes a processor 104 and a memory 106.

Figure 6:
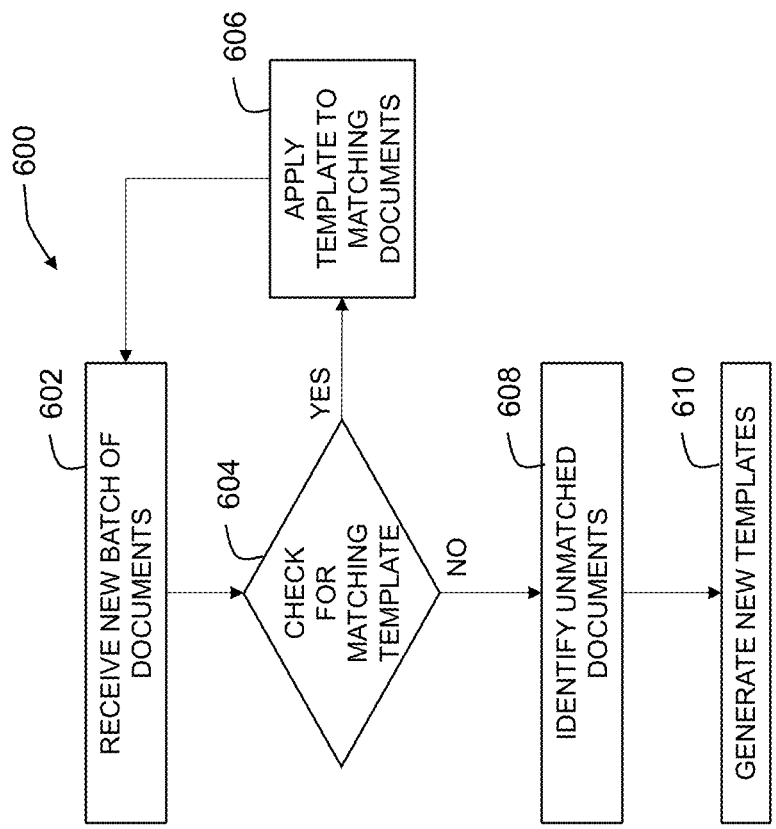
FIG. 6 illustrates a flow chart of an exemplary computer-implemented method for processing documents after the initial batch is processed and templates have been generated.

Template generation server 102 is capable of implementing processes 600 and 700, shown in FIGS. 6 and 7, respectively. As described below in more detail, template generation server 102 is a computing device configured to receive a batch of documents, identify a subset of documents which are identical or substantially similar, and generate a template for the subset of documents.

Template generation server 102 may be in communication with at least one, but more likely many, user computing device 110 that includes a user interface 112. User computing devices 110 may be associated with a human claimant (e.g., policyholder), data analyst, or other person submitting documents that require processing. The user of user computing device 110 may be prompted by the insurance provider (e.g., via template generation server 102) to upload documents via user interface 112 of user computing device 110. In the exemplary embodiment, user computing devices 110 are computers that include a web browser or a software application, which enables user computing devices 110 to access remote servers, such as template generation server 102, the Internet, or other networks. More specifically, user computing devices 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

User computing device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. User computing device 110 may be any personal computing device and/or any mobile communications device of a user, such as a personal computer, a tablet computer, a smartphone, and the like. User computing devices 110 may be configured to present an application (e.g., a smartphone "app") or a webpage. To this end, user computing device 110 may include or execute software, such as a web browser, for viewing and interacting with a webpage and/or an app. Although one user computing device 110 is shown in FIG. 1 for clarity, it should be understood that template generation system 100 may include any number of user computing devices 110.

Template generation server 102 may also be in communication with a data source 120. Data source 120 may be associated with an insurance provider such that the insurance provider may transmit a batch of documents requiring further processing to template generation server 102. Data source 120 may be any computing device as described above that is capable of transmitting the batch of documents to template generation server 102. Alternatively, template generation server 102 may receive documents from user computing device 110.

In various embodiments, template generation server 102 may be directly coupled to a database server 130 and/or communicatively coupled to database server 130 via a network. Template generation server 102 may, in addition, function to store, process, and/or deliver one or more web pages and/or any other suitable content to user computing device 110. Template generation server 102 may, in addition, receive data, such as data provided to the app and/or webpage (as described herein) from user computing device 110 for subsequent transmission to database server 130.

In some embodiments, template generation server 102 may be associated with, or is part of, a computer network associated with an insurance provider, or in communication with insurer network computing devices. In other embodiments, template generation server 102 may be associated with a third party and is merely in communication with insurer network computing devices.

Database server 130 may be any computer or computer program that provides database services to one or more other computers or computer programs. Database server 130 may function to process data received from template generation server 102.

Database 132 may be any organized collection of data, such as, for example, any data organized as part of a relational data structure, any data organized as part of a flat file, and the like. Database 132 may be communicatively coupled to database server 130 and may receive data from, and provide data to, database server 130, such as in response to one or more requests for data, which may be provided via a database management system (DBMS) implemented on database server 130, such as SQLite, PostgreSQL (e.g., Postgres), or MySQL DBMS. Database 132 may be a scalable storage system that includes fault tolerance and fault compensation capabilities. Data security capabilities may also be integrated into database 132. In one embodiment, database 132 may be Hadoop® Distributed File System (HDFS). In other embodiments, database 132 may be a non-relational database, such as APACHE Hadoop® database.

In the exemplary embodiment, database 132 may include various data, such as submitted documents, the document content associated therewith, as well as text blocks, text values, spatial text locations, frameworks, threshold criterion, and generated templates, as described in further detail herein. In the exemplary embodiment, database 132 may be stored remotely from template generation server 102. In some embodiments, database 132 may be decentralized. In the exemplary embodiment, a user may access database 132 via user computing devices 110 by logging onto template generation server 102, as described herein.

Figure 2:
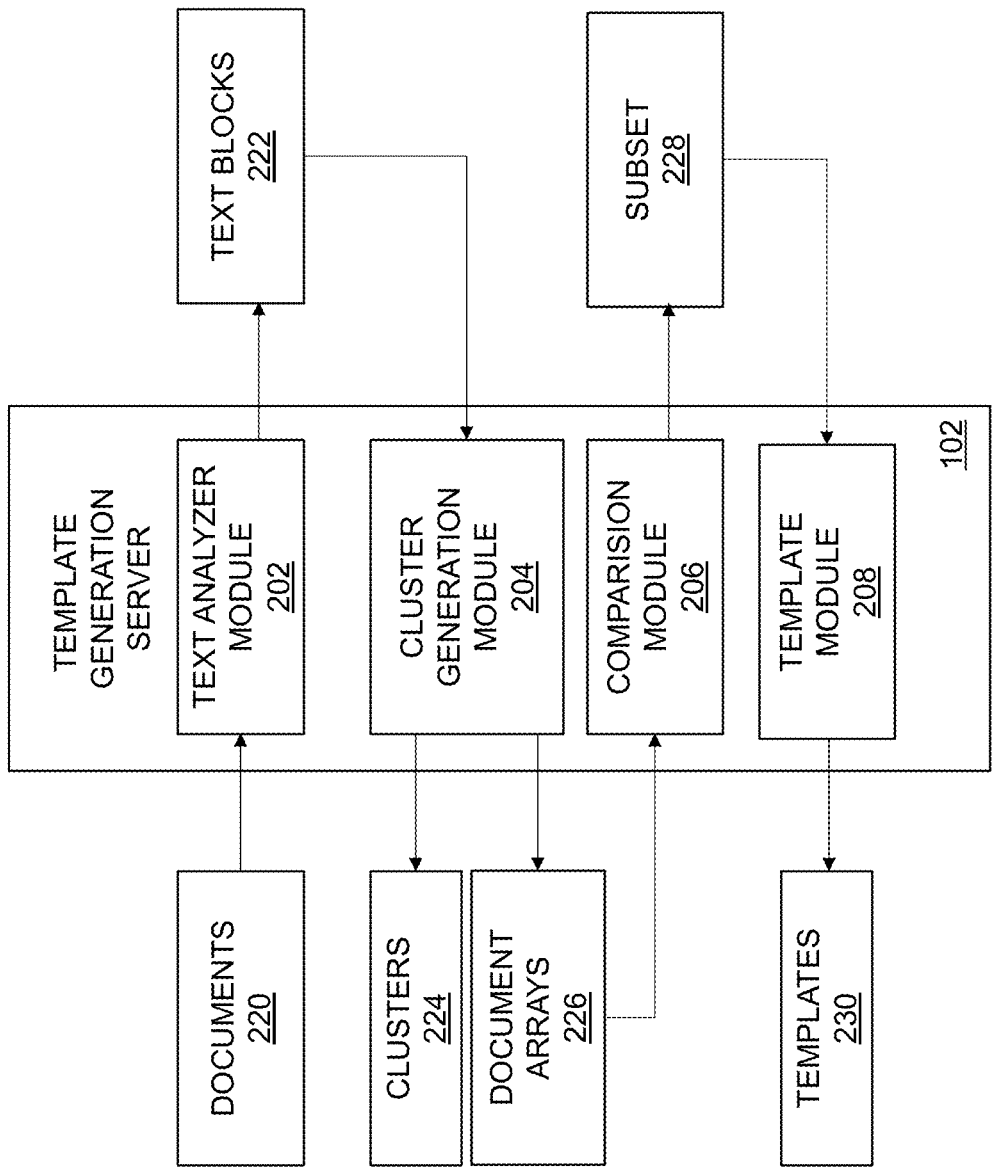
FIG. 2 illustrates the exemplary template generation server in further detail.

FIG. 2 is a diagram that illustrates template generation server 102 in further detail. Template generation server 102 includes a text analyzer module 202, a cluster generation module 204, a comparison module 206, and a template module 208. These modules may be implemented or executed using processor 104.

Text analyzer module 202 receives a batch of documents 220 from data source 120 or user computing device 110, as shown in FIG. 1. As described above, the documents need not be of the same type. Text analyzer module 202 performs optical character recognition (OCR) functionality to scan the text of the document to parse and extract text, which text analyzer module 202 organizes into text blocks 222. Text blocks 222 include a text value and spatial text location. Cluster generation module 204 receives text blocks 222, compares the text value and spatial text location for each text block, identifies text blocks which have identical or substantially matching text values and identical or substantially matching spatial text locations, and creates clusters 224. A substantial match of text values may include a fuzzy match. As used herein, "fuzzy match" refers to text values that substantially match, but accounts for inaccuracies introduced by typos, misspellings, or OCR. In the exemplary embodiment, a fuzzy match accounts for 15% of characters being misspelled. A Levenshtein function may be used to define fuzzy matches. A substantial match of spatial text location is defined by the lower left points and upper right points of two or more text blocks 222 aligning exactly or within a defined threshold. Cluster generation module 204 also generates document arrays 226 corresponding to each identified cluster. Comparison module 206 then receives the document arrays 226. Comparison module 206 compares the document arrays 226 and stores threshold criterion, and when these conditions are met, comparison module 206 defines a subset 228. Template module 208 receives the subsets 228 and generates templates 230 corresponding to each subset.

As shown in FIG. 1, template generation sever 102 is communicatively coupled with database server 130 and database 132. The database 132 stores the documents 220, text blocks 222, clusters 224, document arrays 226, subsets 228, and the templates 230.

Figure 3:
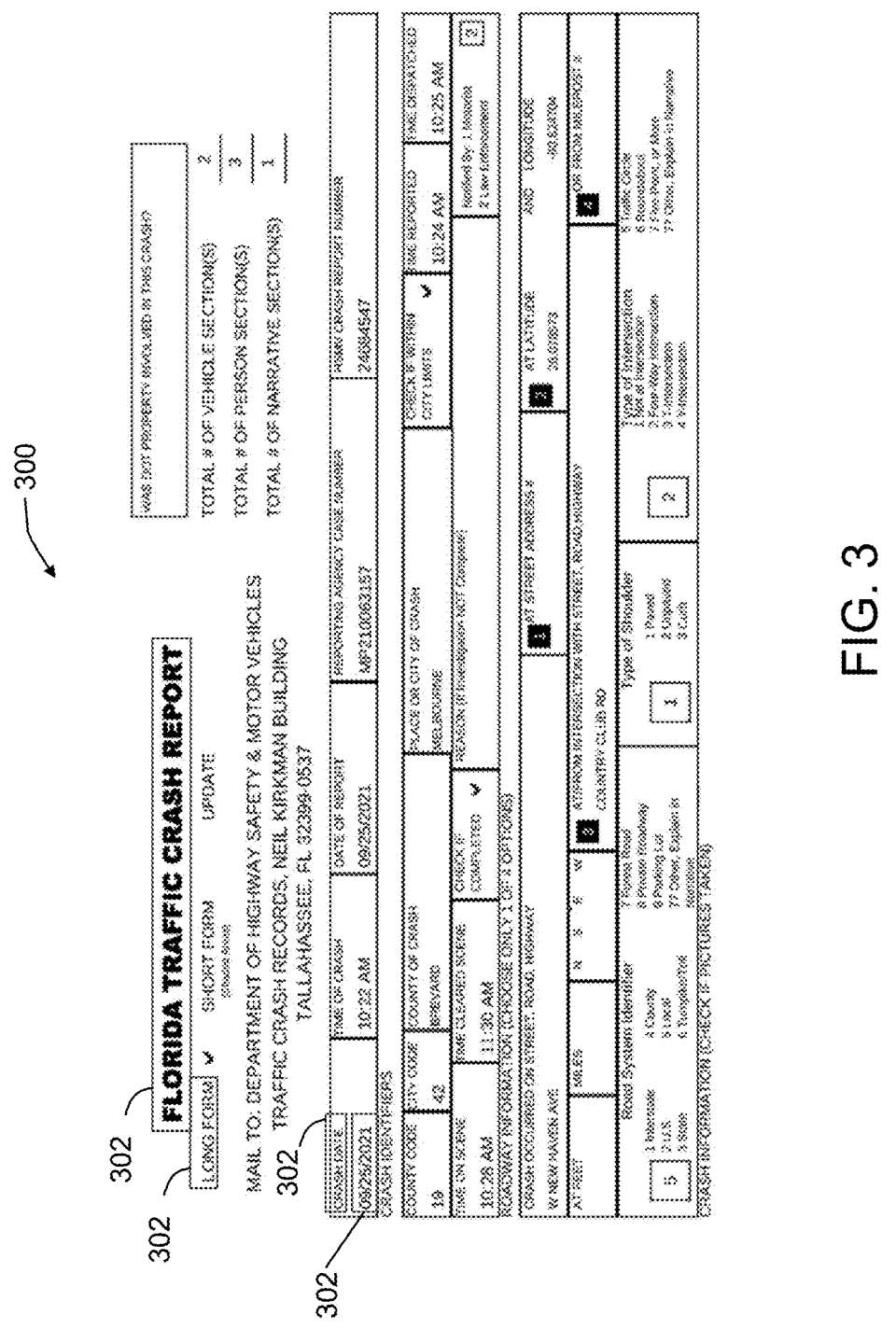

FIG. 3 illustrates an example of a document 300 which may be inputted into template generation system 100 (shown in FIG. 1). Document 300 may be similar to document 220 (shown in FIG. 2). Document 300 includes text blocks 302, which are defined by a text value (which may be either a static text value or a variable text value) and a spatial text location of that associated text value. As described above, static text values are unchanged between documents 300 of the same type. Static text values may include the document title, field labels, or any other static portion of the template document. For example, "FLORIDA TRAFFIC REPORT", "CRASH DATE", "TIME OF CRASH", and "DATE OF REPORT" represent static text values. Variable text values are portions of the document 300 which change between documents 300 of the same type. Variable text values are generally prompted to be filled in by the corresponding static text values. For example, "CRASH DATE" is the static text value, and "09/25/2021" is the corresponding variable text value.

Template generation system 100 relies upon static text values to identify documents 300 of the same type. Static text values remain unchanged across instances of a particular type of document 300, and therefore, subsets can be identified by focusing on static text. Template generation system 100 analyzes text blocks 222 (shown in FIG. 2), which include a text value and a text location, generates a framework for each document 300 that includes all the text blocks 222 included in that document 300, and generates templates 230 when threshold criterion is met.

Figure 4:
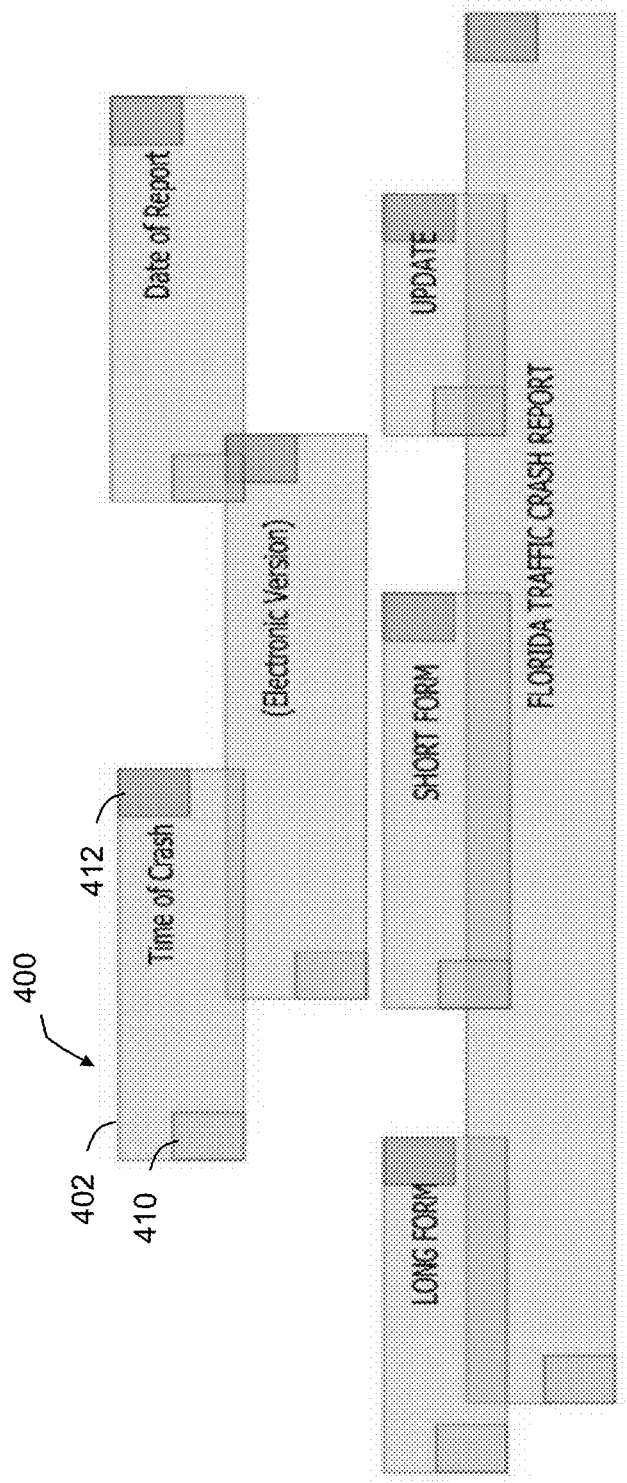
FIG. 4 illustrates a diagram of text blocks identified by the template generation system.

FIG. 4 illustrates a diagram of text blocks 400 as identified by template generation system 100. As described above and shown in FIG. 2, text analyzer module 202 performs an OCR function and scans each input document 220 to identify text within the document 300 (shown in FIG. 3). Text blocks 400 may be similar to text blocks 222 (shown in FIG. 2). Text analyzer module 202 identifies lines of text, for instance, and then organizes the lines of text as text blocks 400. Each text block 400 includes a text value (e.g., an OCR value) and a text location. Template generation system 100 identifies a text field box 402 which defines a boundary around the text block 400. Template generation system 100 may identify a plurality of coordinates or bounding boxes that define the text field box 402. In the example embodiment, a lower left bounding box 410 and an upper right bounding box 412 are used to define the text field box 402. Each bounding box 410, 412 is made up of a cluster of points. The lower left bounding box 410 is referred to as geometry 1 and the upper right bounding box 412 is referred to as geometry 2. In other embodiments, any number of bounding boxes 410 and 412 may be used to define a text field box 402. The bounding boxes 410 and 412 are derived from a geometric median of the cluster of points which make up each bounding box 410, 412. The geometric median is the center of an expand function to create a box around the geometric median, sometimes referred to as a centroid. The text field boxes 402 are spatially indexed for high performance. A GIST index or any other indexing function may be used for faster spatial processing.

For each text block 400, the database 132 (shown in FIG. 1) may store the bounding boxes 410 and 412 corresponding to the text field box 402. Notably, defining a text field block 402 using a set of bounding boxes 410 and 412 allows for a document layout to be represented by minimal data elements. Further, because a minimal amount of data is required to provide the text location, processing speeds may be improved over other known methods of document processing.

As previously discussed, the system and method utilize a small and simple set of data to perform template generation. This eliminates the need for complex computing resources and leads to faster processing times. Further, the system and method do not require a training step, which would require a training set of data. The template generation system 100 may generate templates 230 immediately upon receiving an initial batch of documents 220. Further, the template generation system 100 may store the results of the template generation of an initial batch, receive further batches, and either match the new documents 220 to existing templates 230 or create new templates 230.

Figure 5:
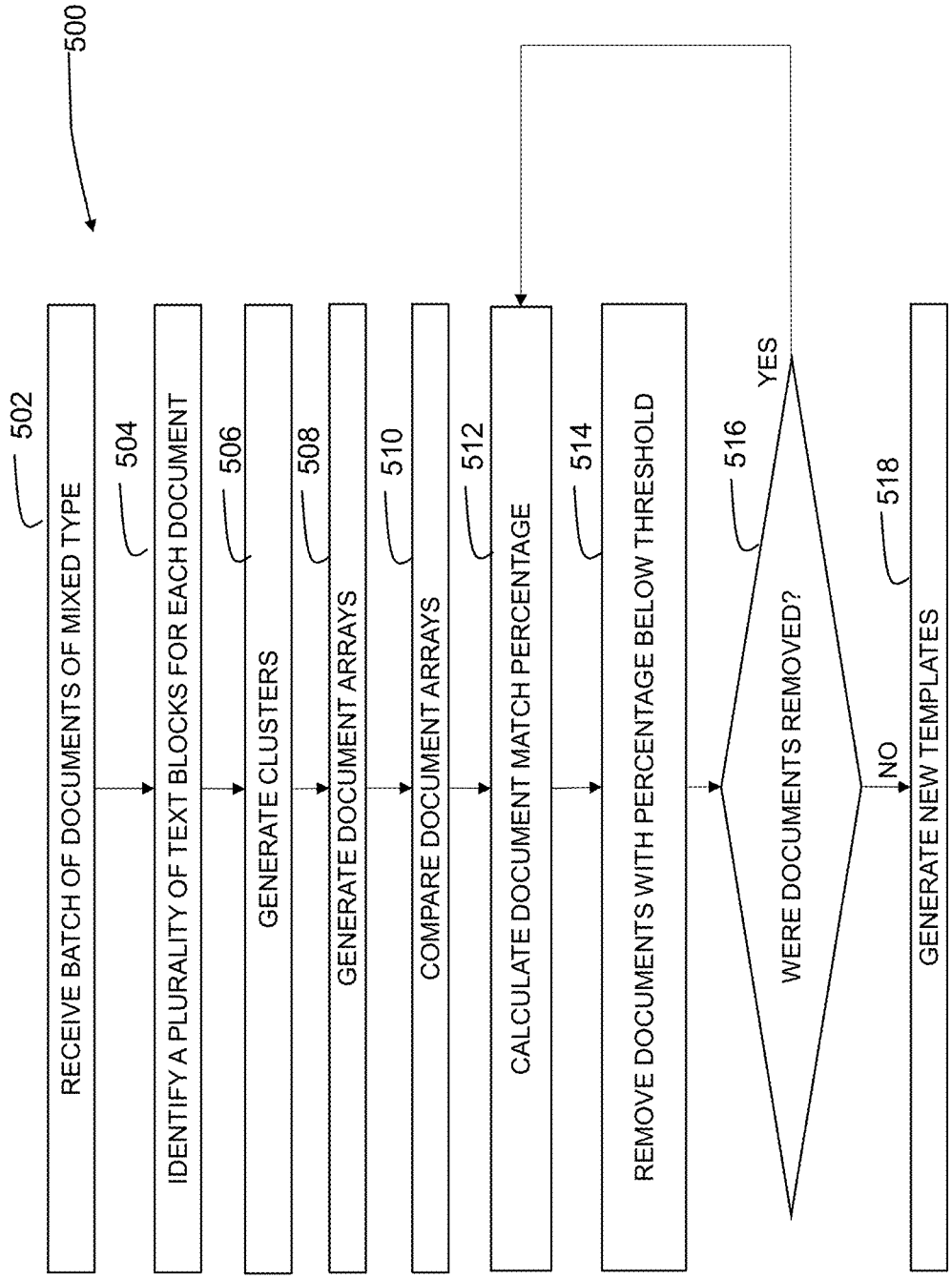
FIG. 5 illustrates a flow chart of an exemplary computer-implemented method for generating templates from an initial batch of documents.

FIG. 5 illustrates a flow chart 500 of an exemplary computer-implemented method for generating templates from an initial batch of documents 220 (shown in FIG. 2). In a first step, the template generation system 100 receives 502 a batch of documents of mixed document types. The batch of documents 220 may include any number of different types of documents 220.

In a second step, the template generation system 100 identifies 504 a plurality of text blocks 400 (shown in FIG. 4) for each of the documents 220. Template generation system 100 scans each page of each document 220 to locate lines of text. Each line of text can be further parsed to identify text blocks 400. Each text block 400 includes a text location and a text value (e.g., an OCR value). The text location may be defined by the OCR process. In the exemplary embodiment, the text location is determined by the OCR process and is generally located between the two bounding boxes 410 and 412. As described above, the text blocks 400 may be static text fields or variable text fields.

For each text block 400 identified, an entry is created in a database 132 (shown in FIG. 1), including the text location and the text value. The database 132 may store other information related to the text block 400 including document identification, page number, etc.

In a third step, template generation system 100 generates 506 clusters 224 (shown in FIG. 2) which are arrays of identified text blocks 400, each cluster corresponding to a group of text blocks 400 with matching text value and overlapping spatial location located on different documents 220. Each cluster is assigned a cluster ID and includes the text value and spatial location of the cluster 224. Known algorithms, such as DBSCAN, may be used to perform this clustering step. The algorithm is used to spatially cluster the text location represented by bounding boxes described above, sometimes referred to as geometry 1 and geometry 2, while partitioning by text value. The distinct combination of text value and text location (e.g. as defined by geometry 1 and geometry 2) is assigned a numeric value referred to as cluster ID or element cluster ID.

In a fourth step, template generation system 100 generates 508 document arrays 226 (shown in FIG. 2) corresponding to each identified cluster 224 and cluster ID. Each document array 226 contains includes a reference to each of the documents 220 included in the corresponding cluster 224. The documents 220 for each cluster 224 in the cluster ID are aggregated in the document array 226. For each identified cluster 224 and cluster ID, template generation system 100 combines the point clusters of each bounding box of the text blocks 222 in the cluster 224 into a geometric median. The geometric median is used as the center of the bounding boxes in the matching steps.

In a fifth step, the template generation system 100 compares 510 the document arrays 226 to identify overlap between arrays 226. In a practical sense, comparing the document arrays 226 identifies documents 220 with a threshold number of clusters 224 in common. In the exemplary embodiment, arrays 226 overlapping by 70% or more are considered to meet the threshold. Once the threshold is met, a preliminary subset 228 (shown in FIG. 2), sometimes referred to as a temporary document ID array cluster, is defined.

In a sixth step, for each preliminary subset 228, template generation system 100 calculates 512 a document match percentage. The clusters 334 are aggregated for each document 220 to determine a document cluster count. The document cluster counts for each of the documents of the preliminary subset 228 are aggregated to determine a total cluster count. A document match percentage can be determined by dividing each document cluster count from the total cluster count. The document match percentage represents the degree to which a plurality of documents 220 matches the rest of the documents 220. In the example embodiment, a document match percentage of 85% is required to determine a final subset 228 and generate a template 230.

In a seventh step, template document system removes 514 document IDs which have a document match percentage less than the determined document match percentage.

In an eighth step, template document system checks 516 to see if documents 220 were removed from the preliminary subset 228. If documents 220 were removed, template generation system 100 then repeats the sixth and seventh steps until no document IDs are removed in the seventh step.

In another step, template generation system 100 generates 518 a template 230 for the final subset 228 of documents 220. The final subset 228 of documents 220, sometimes referred to as the formal template ID, is determined to include the subset 228 of documents 220 remaining after documents 220 are removed in the seventh step. The template 230 includes a common framework which includes all of the text blocks which identically or substantially match across the subset 228 of documents 220. A unique value may be generated to identify the template 230. The templates 230 may be stored in a database 132. For example, a table may be generated in the database 132 to store the template 230, and the table may include reference to the documents 220 that are included in the subset 228 used to generate the template 230.

The generated templates 230 and identified subsets 228 may be used to identify documents 220 and aid in routing the documents to the appropriate party. Once the type of document 220 is known, the document 220 may be routed more efficiently. Further, the template 230 may be applied in order to extract information from the document 220. As described above, the static text fields are used to identify text which remains the same across documents 220 of the same type, and the variable text fields are largely ignored. Once a document type is identified, the document 220 can be sent to an extraction process. A different set of templates 230 may be generated for the extraction process.

The method described above relates to receiving an initial batch of documents 220 and generating templates 230. However, there may be a need to receive additional batches after the initial batch has been processed. The data from the initial batch of documents 220 and the templates 230 generated may be retained in the database 132 and utilized when future batches are received. The documents 220 included in future batches may be matched to existing templates 230 or new templates 230 may be created. It is possible that not every document 220 of the initial batch was associated with a template 230. Unmatched documents may be retained in a table in the database 132 and considered along with future batches.

FIG. 6 illustrates a flow chart of an exemplary computer-implemented method 600 for processing documents 220 (shown in FIG. 2) after the initial batch is processed and templates 230 (shown in FIG. 2) have been generated. First, template generation system 100 receives 602 a new batch of documents 220. For each of the documents 220 in the new batch, the template generation system 100 identifies text blocks 222 (shown in FIG. 2) according to the same methods described above. However, the documents 220 of the new batch are first compared to existing templates 230. Template generation server checks 604 for matching templates 230 by comparing the text blocks 222 of the new documents 220 and determining a percentage match between the document 220 and one of the existing templates 230. If a match is found, the template generation system 100 applies 606 the template 230 to the matching document. The template 230 with the highest percentage match is returned as the matching template 230. If a match is not found, template generation system 100 identifies 608 unmatched documents 220. The unmatched documents 220 may include documents 220 from the initial batch, which have been retained in the database 132 (shown in FIG. 2), and documents 220 from the new batch. Finally, template generation system 100 generates 610 new templates 230 according to the methods described above for any documents 220 which have not been matched to an existing template 230.

In at least some embodiments any documents 220 which have not been assigned a template 230 may be retained in the database 132 and considered against any new batches of documents 220 received in order to generate new templates 230. The process is iterative, and templates 230 continue to be generated as new documents 220 are received.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are for example purposes only, and thus are not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A template generation system comprising a template generation server comprising a memory and at least one processor, wherein the at least one processor is programmed to:
   receive a batch of documents including a plurality of documents of different document types;
   identify a plurality of text blocks located within each document of the batch of documents, wherein each text block includes a text value and a spatial location of the text block within the document, wherein the spatial location is defined by a field box including at least two bounding boxes;
   generate a plurality of clusters, wherein each of the plurality of clusters includes the plurality of text blocks identified in each respective document, wherein each of the plurality of text blocks included in each cluster has substantially matching text values and spatial locations;
   generate a plurality of document arrays, wherein each of the plurality of document arrays corresponds to one of the plurality of clusters and includes a listing of documents containing the plurality of text blocks included in the cluster;
   compare each document array to each other document array to determine a percentage match;
   when the percentage match between two or more document arrays exceeds a first threshold, define a preliminary subset of documents including the documents included in the matching document arrays;
   compare the plurality of clusters corresponding to a matching document array to other plurality of clusters in each other matching document array to determine a document match percentage for each of the preliminary subset of documents;
   define a final subset of documents by removing any of the preliminary subset of documents having the respective document match percentage below a second threshold; and
   for each final subset of documents, generate a template.

2. The template generation system of claim 1, wherein the at least one processor is further programmed to:

store within a database the plurality of text blocks, wherein each entry of the database includes a document reference for a respective document, the text values for the respective document, and the spatial locations for the respective document.

3. The template generation system of claim 1, wherein the at least one processor is further programmed to store within a database the clusters.

4. The template generation system of claim 1, wherein the at least one processor is further programmed to:
generate a subset identifier for each final subset; and
assign the subset identifier to each corresponding document of the final subset.

5. The template generation system of claim 1, wherein the at least one processor is further programmed to cache the document if no match is found.

6. The template generation system of claim 1, wherein each of the first and second thresholds is a user defined value.

7. The template generation system of claim 1, wherein a cluster of points are used to define each bounding box.

8. The template generation system of claim 7, wherein each bounding box is derived from a geometric median of the cluster of points.

9. The template generation system of claim 1, wherein the processor is further programmed to:
identify at least one variable text value by applying the generated template; and
extract the at least one variable text.

10. A computer-implemented method of generating a template, the method implemented by a template generation server having a memory and a processor, the method comprising:
receiving a batch of documents including a plurality of documents of different document types;
identifying a plurality of text blocks located within each document of the batch of documents, wherein each text block includes a text value and a spatial location of the text block within the document, wherein the spatial location is defined by a field box including at least two bounding boxes;
generating a plurality of clusters, wherein each of the plurality of clusters includes the plurality of text blocks identified in each respective document, wherein each of the plurality of text blocks included in each cluster has substantially matching text values and spatial locations;
generating a plurality of document arrays, wherein each of the plurality of document arrays corresponds to one of the plurality of clusters and includes a listing of documents containing the plurality of text blocks included in the cluster;
comparing each document array to each other document array to determine a percentage match;
when the percentage match between two or more document arrays exceeds a first threshold, defining a preliminary subset of documents including the documents included in the matching document arrays;
comparing the plurality of clusters corresponding to a matching document array to other plurality of clusters in each other matching document array to determine a document match percentage for each of the preliminary subset of documents;
defining a final subset of documents by removing any of the preliminary subset of documents having the respective document match percentage below a second threshold; and
for each final subset of documents, generating the template.

11. The computer-implemented method of claim 10, the method further comprising:
storing within a database the plurality of text blocks, wherein each entry of the database includes a document reference for a respective document, the text values of the plurality of text blocks for the respective document, and the spatial locations of the plurality of text blocks for the respective documents.

12. The computer-implemented method of claim 10, the method further comprising storing within a database the clusters.

13. The computer-implemented method of claim 10, the method further comprising:
generating a subset identifier for each final subset; and
assigning the subset identifier to each corresponding document of the final subset.

14. The computer-implemented method of claim 10, the method further comprising caching the document if no match is found.

15. The computer-implemented method of claim 10, wherein the threshold is a user defined value.

16. The computer-implemented method of claim 10, wherein a cluster of points are used to define each bounding box.

17. The computer-implemented method of claim 16, wherein each bounding box is derived from a geometric median of the cluster of points.

18. The computer-implemented method of claim 10, the method further comprising:
identifying at least one variable text value by applying the generated template; and
extracting the variable text.

19. A template generation system comprising a computing device comprising at least one memory and at least one processor, wherein the template generation system is communicatively coupled to a database, wherein the at least one processor is programmed to:
store, in the database, a plurality of templates, each template corresponding to a subset of documents;
store, in the database, a plurality of matched documents, wherein each matched document includes an identifier matching to one of the plurality of templates;
store, in the database, a plurality of unmatched documents, wherein each of the unmatched documents do not include an identifier matching to one of the plurality of templates;
receive a batch of new documents including a plurality of different document types;
identify a plurality of text blocks located within each new document of the batch of new documents, wherein each text block includes a text value and a spatial location of the text block within the new document, wherein the spatial location is defined by a field box including at least two bounding boxes;
generate a plurality of clusters, wherein each of the plurality of clusters includes the plurality of text blocks identified in each respective new document, wherein each of the plurality of text blocks included in each cluster has substantially matching text values and spatial locations;
generate a plurality of document arrays, wherein each of the plurality of document arrays corresponds to one of the plurality of clusters and includes a listing of new documents containing the plurality of text blocks included in the cluster;

compare each document array to each other document array to determine a percentage match;

when the percentage match between two or more document arrays exceeds a threshold, define a preliminary subset of documents including the documents included in the matching document arrays;

compare the plurality of clusters corresponding to a matching document array to other plurality of clusters in each other matching document array to determine a document match percentage for each of the preliminary subset of documents;

define a final subset of documents by removing any of the preliminary subset of documents having the respective document match percentage below a second threshold; and for each of the final subset of documents matching one of the plurality of templates stored in the database, apply an appropriate template identifier.

20. The template generation system of claim 19, wherein the at least one processor is further programmed to:

for each of the final subset of documents not matching one of the plurality of templates stored in the database, generate a new template for the unmatched subset of documents, wherein the new template is a collection of the plurality of text blocks which are commonly included in each of the new documents of the unmatched subset.

* * * * *